March 14, 1933.  L. BUERGER  1,901,731
CYSTOSCOPE AND THE LIKE
Filed May 9, 1932
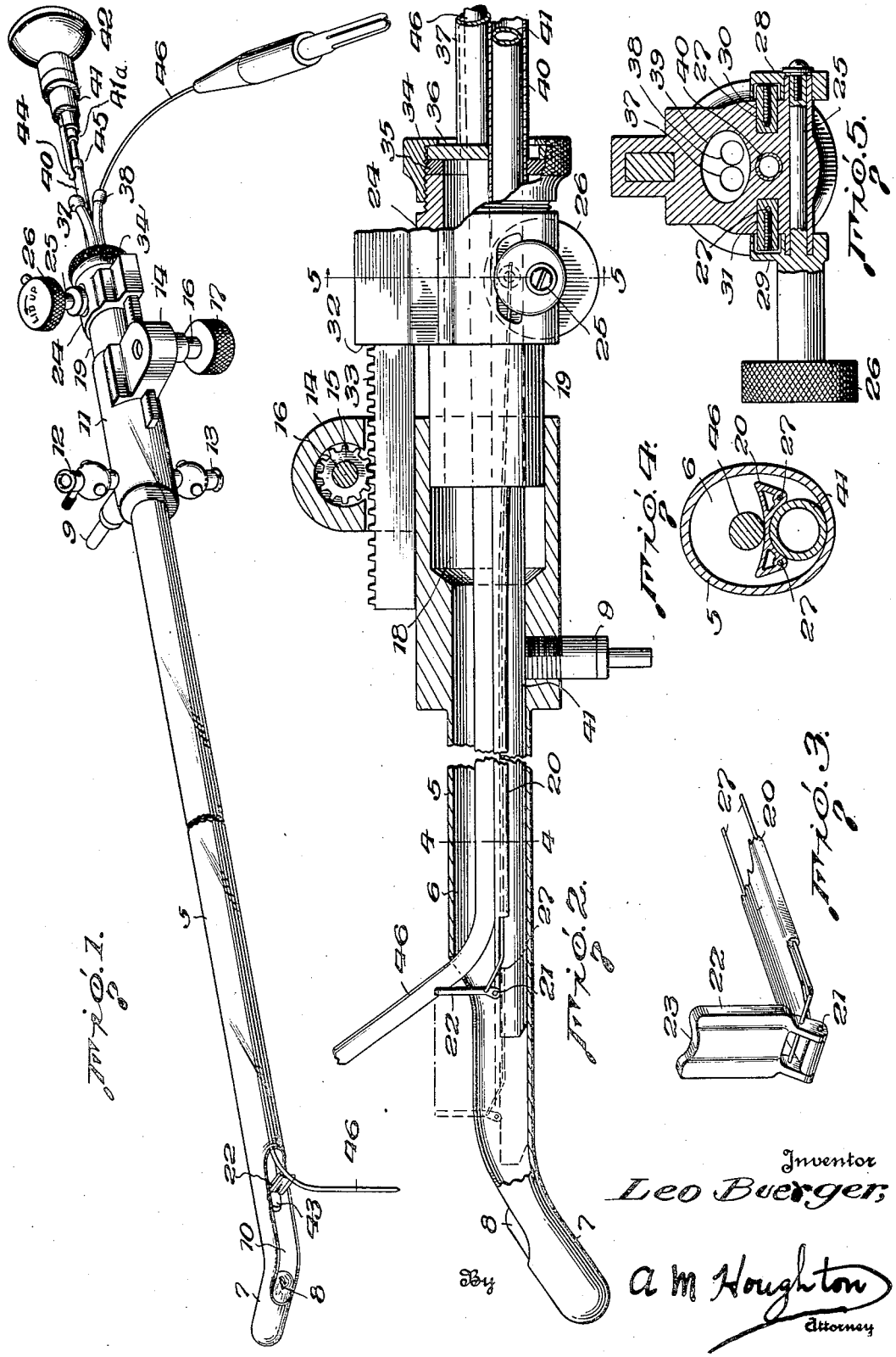
Inventor
*Leo Buerger*
By *A M Houghton*
Attorney Patented Mar. 14, 1933

1,901,731

UNITED STATES PATENT OFFICE

LEO BUERGER, OF NEW YORK, N. Y.

CYSTOSCOPE AND THE LIKE

Application filed May 9, 1932. Serial No. 610,269.

This invention relates to cystoscopes and the like; and it comprises a sheath having a window and a telescope introducible in the sheath, and means for moving the telescope and thus the objective lens along the length of the window; and it further comprises a cystoscope having the usual sheath, a tool deflector in the sheath and arranged to be moved along the length of the window whereby an instrument such as a bougie or the like may be operated by said deflector at various points along the length of the window, the telescope and the deflector being advantageously arranged for simultaneous movement in the sheath in order that the objective lens of the telescope may be adjacent to the point of deflection of the tool; all as more fully hereinafter set forth and as claimed.

Devices of the character to which this invention relates are intended to be used in cavities of the body and must be exceedingly small in diameter with the internal parts compactly arranged. These devices usually consist of a tube or sheath with a window or fenestra at one end, an electric light at the same end and a telescope having its objective lens located in the window. In addition, means are usually provided for the insertion of a tool in the sheath and through the window for operative purposes.

The area of operation and inspection is limited to points lying in a cone whose apex is at the objective lens of the telescope, the axis of the cone being directed away from the objective lens at an angle known as "the angle of vision". In the field of inspection the base of the cone is the inside of the cavity to be inspected.

It is a desideratum in this art to provide means for widening the area of operation and observation while at the same time not unduly increasing the size of the cystoscope.

It is a general object of my invention to provide an improved cystoscope for exploration of the various internal portions of the body and for performance of various operations on such portions while under the view of the operator and to provide a cystoscope by means of which internal portions of the body hitherto inaccessible can be reached by various manipulated devices such as catheters, bougies, etc.

It is a further object of my invention to provide means for moving both the telescope and operating device along the length of the window in the cystoscope, permitting a precise control and much wider range of operation than has heretofore been afforded by any prior cystoscope.

With these and other objects in view my invention consists of a cystoscope having the usual tube or sheath, provided at one end with an elongated window or fenestra in which is the usual light, and carrying in the sheath a movable telescope together with a movable deflector device, both of which are operated advantageously through the same control mechanism at the end of the cystoscope away from the window whereby a catheter or the like may be deflected through the window at various points and whereby the objective lens of the telescope may be positioned at different points along the length of the window.

By reason of the motion of translation transmissible to telescope and deflector within the window or fenestra, the true vista, without regard for and excluding possibilities brought about by moving the sheath itself, is within a series of overlapping cones; the apex of each cone being determined by the position of the telescopic objective lens.

In no other instrument is it possible to convert the fenestra of the sheath, at will, and by mere motion of a milled wheel, from one permitting of emergence and control of large tools for larger cavities into a fenestra of virtually small size.

The faculty of causing a recession of deflector and telescope to a point just beyond or at the proximal end of the window, which we may call its emergence point, adds further important qualities and functions to the cystoscope, to wit:

It virtually converts the cystoscope into a cysto-urethroscope, an instrument that is used for viewing and for manipulation within the constricted compass of the urethra. Such reduced working space necessitates a close spatial inter-relationship between the point of tool emergence, axis of deflection and tool itself, the successful manipulation of the tool depending on the possibility of negotiating requisite movements of the tool within the reduced confines of the urethra.

In the accompanying drawing, in which similar reference numerals designate corresponding parts throughout the several views, I have shown a specific embodiment of my invention.

Fig. 1 is a perspective view of my improved cystoscope;

Fig. 2 is an enlarged longitudinal section showing the invention and how the angle of the manipulative device is changed;

Fig. 3 is an enlarged fragmentary perspective view of the deflector shaft and deflector showing the deflector in upright position;

Fig. 4 is a section through the line 4—4 of Fig. 2;

And Fig. 5 is a section taken through line 5—5 of Fig. 2 showing a view of the deflector plate operating knob and means for moving the connecting wires.

In the drawing, 5 indicates the sheath of general tubular form having an ovoidal cross-section and an axially disposed bore 6 of similar cross-section. This sheath has one end formed into a beak 7 which may be either a down-turned or up-turned portion as well established in the art, but is here shown as down-turned. The beak 7 is provided with a small electric lamp 8 mounted in a socket in the usual manner on the convex side and electrically connected with a terminal 9 by leads, not shown. If the beak be up-turned, the lamp is mounted in the concavity of the sheath resulting from the bend. The terminal 9 may be of the well known "rotating contact" type such as is shown, for example, in the Catalogue of Diagnostic Instruments, published May 15, 1930 by the American Cystoscope Makers Inc., on page 20A. This construction forms no part of my invention. The sheath 5 is provided with a lateral fenestra or window 10 extending a substantial distance rearwardly from the bend for the purposes of inspection, lighting and manipulation of operating devices. At the opposite end of the sheath is provided a housing or collar 11 carrying electric terminal 9, a pair of valved openings 12 and 13 for discharging urine or irrigating fluid and a slotted carrier 14 provided with a pinion 15 mounted on a shaft 16. This shaft carries a milled wheel 17 for manual operation of the pinion. The housing 11 of the sheath has a bore 18 of slightly larger diameter than the bore 6 and of circular cross-section. Cylindrical closure plug 19 closely fits and slides in enlarged bore 18 when inserted in the open end thereof and has attached to its inner face a shaft 20. This shaft 20 is constructed of metal and has a cross-section with concave upper surface, as shown in Fig. 4, in order to permit a maximum amount of room within the sheath for the insertion of catheters or like instruments. The shaft 20 lies against the telescope, hereinafter described, in sheath 5 when plug 19 is in position. The free end of shaft 20 is flattened as shown in Fig. 3 and is provided at its extremity with a pin 21 journalled therein and carrying deflector plate 22 having a concave top edge 23 for positioning an operating tool, as hereinafter described. The concave edge 23 further serves to expose the objective lens of the telescope even when the deflector plate is lowered.

The closure plug 19 is provided at its rear end with collar 24 carrying a shaft 25 manually operable by a knurled wheel 26. Attached to shaft 25 on either side of collar 24 are two eccentrics 28 and 29 which engage pins 30 and 31, respectively. These pins are attached by means of set screws to the ends of wires 27 so that when the knurled wheel 26 is moved back and forth the deflector 22 is raised or lowered as shown in Figs. 2 and 5. Attached to the collar 24 at 32 is a toothed rack 33 adapted to be engaged by pinion 15 when closure plug 19 is inserted in bore 18. A threaded packing gland 34 with milled outer rim is adapted to engage a threaded portion of the rear end of collar 24 and to hold thereto in water tight connection a suitable bored packing 35, made of soft rubber or other suitable substance, by means of disc 36. As shown in the drawing, this disc carries two diverging tubes 37 and 38 registering with a bore 39 in the plug when in position; but whenever it is intended to utilize a single maximum passage above the deflector shaft for the introduction of bougies, catheters, etc., then a disc with a lower aperture for a telescope and an upper aperture for the introducible instrument is employed. The two diverging tubes shown in the drawing are for the so-called double catheter insertion.

The closure plug 19 is provided with a round bore carrying a guiding tube 40 of small diameter for the introduction of a telescope 41. The inner opening of the bore is immediately under the point where the shaft 20 is attached so that the telescope when inserted in the plug lies immediately below and against the under side of the deflector shaft 20.

The telescope 41 is of the usual tubular construction and is provided at one end with an adjustable eye-piece 42 and at the other end with an objective lens 43. Its tube at the eye-piece end is provided with a spring clip 44 fitting over a collar 45 on the end of guiding tube 40 to hold it in a fixed position when inserted in the tube 40. The telescope tube 41 is made sufficiently long so that there is a play of about 1 cm. between the collar 45 and a stop 41a on the telescope tube. The operator may push the telescope inwardly independently of the deflector shaft for any distance up to 1 cm. whenever the deflector shaft, together with the telescope, have been caused to recede outwardly in the fenestra a like distance. Spring clip 44 serves to engage the collar 45 with sufficient tension to hold the telescope fixed in any position in the tube 40 after movement of the telescope by the operator. When a bougie such as 46 is used it may be inserted through either of guiding tubes 37 or 38 as shown in Figs. 1 and 2 in various operative positions. Any suitable instrument may be substituted therefor as the exigencies of any particular case may demand. When not in use the ends of the guiding tubes are closed by suitable stoppers to render them water tight.

In operation, the end of the cystoscope being in position at the bladder, the terminal 9 is connected to a source of current to light the lamp 8 and permit inspection by means of telescope 41. The operator having inspected the bladder and decided upon the operation to be performed, the sheath is allowed to remain in the bladder, but the telescope and the deflector shaft are removed. The deflector shaft and closure plug are then prepared, or had already been prepared if the procedure was known before the sheath was introduced, in respect first to the suitable disc 36 and packing 35 and in respect to the particular device, bougie or catheter, etc., to be used. Whenever the two tubed diverging channels are appropriate, such are adapted to the deflector shaft and made water tight by means of the gland 34 and the bougie or catheter, etc. is then inserted into one or both tubes as required and introduced far enough so that it may be temporarily clipped to the shaft near the deflector. If a single, larger, spiral, rod-like, tubular bougie or catheter is required, the appropriate single outlet occluding disc and washer are attached by means of the gland 34, and the selected instrument similarly inserted. With the tool lying against the deflector shaft these are introduced together into the sheath, and then the telescope made to follow through its appropriate channel.

By rotation of the milled wheel 17 the objective lens of the telescope 43 and the deflector plate 22 may be moved along the length of the window in a longitudinal direction and by rotation of the milled wheel 26 the deflector plate 22 may be raised or lowered. The resultant motion imparted to the bougie 46 by these movements enables the angle between the operating end of the bougie 46 and the sheath 5 of the cystoscope to be varied between 0 and 90° or an even greater angle. A wide range of manipulation is thus afforded the bougie as a result of the motion which may be imparted to it by milled wheels 17 and 26. If large instruments are to be projected through the fenestra or if the objective lens of the telescope is of the type giving retrograde vision, the operator is permitted by means of the play between the collar 45 and the stop 41a to push the telescope inwardly for a distance of 1 cm. or less, independently of the deflector and deflector shaft. In this way the distance between the objective lens of the telescope and the deflector can be varied so that the deflector plate or tools may be made to occupy a smaller portion of the field of vision than if the lens were nearer the deflector, and the limitations resulting from a fixed relation between the objective lens and the deflector may be overcome. In this manner the operator is enabled to operate on parts of the bladder hitherto inaccessible while keeping constantly in his view the portion upon which he is operating and he is enabled to adjust the objective lens of the telescope to increase the range of vision to a large extent over heretofore known cystoscopes.

The cystoscope described need not be larger than the usual cystoscope, is a compact device, easily assembled and arranged for a convenient operation.

I do not wish to limit myself to the precise mechanism here shown, as variations may be made without departing from the spirit and scope of my invention defined in the appended claims.

What I claim is:—

1. In a cystoscope having a window near one end and a telescope comprising a tube with an objective lens fixed in one end and an eye-piece in the other end, means for moving the telescope and thus the objective lens along the length of the window.

2. A cystoscope comprising a sheath having an elongated window near one end, a telescope in said sheath with its objective lens in said window, a deflector for tools comprising a shaft associated with said telescope and carrying at one end adjacent said lens a movable member, means at the other end of the sheath for raising said member, and means for inserting a tool in the sheath with the operating end thereof adjacent said deflector member and arranged to be projected through the window by means of said member; and means for positioning the telescope lens and deflector member at various points along the length of said window.

3. A cystoscope comprising a sheath having a window near one end, a housing at the other end, a plug slidable in said housing, means associated with the housing and plug for sliding the plug in said housing, a shaft carried by said plug and having at its extremity a movable member, means for moving said member extending to said plug, means on the plug connected with said last named means to operate it to move the said member on said shaft, whereby a tool located over the shaft with its operating part adjacent the member on said shaft may be raised and lowered through said window at any one of a number of points along the length thereof, and a telescope in said sheath having its objective lens in said window and provided with a tube extending through said housing and said plug, said telescope being associated with the plug to move therewith.

4. In a cystoscope having a sheath with a window near one end, a tool deflector comprising a shaft in said sheath, and a deflecting member near one end of said shaft at said window, means for operating said deflector member and means for moving the deflector shaft and thus the deflector member to different positions along the length of the window.

5. In a cystoscope having a sheath with an elongated window at one end and provided with a deflector plate, a deflector shaft, a movable plug housed in said sheath and attached to said deflector shaft and means to move said plug and shaft to any one of a number of points within said sheath, guiding means attached in said plug, a telescope adapted to be inserted in said guiding means and arranged adjacent said deflector shaft with its objective lens adjacent said deflector plate and means for securing said telescope in said guiding means whereby any movement of said plug in said sheath imparts a corresponding movement to the telescope and the deflector shaft.

6. In a cystoscope having a sheath with an elongated window at one end and a surgical operating tool adapted to be passed through said sheath until its operating end protrudes into said window, means for varying the angle between said operating end of said tool and said sheath from 0° to 90°.

7. A cystoscope comprising a sheath having an elongated window at one end, a housing at the other end, a deflector shaft, a deflector plate pivoted at one end of said shaft, a board movable plug slidable in said housing and attached to the other end of said deflector shaft, means extending from the pivoted deflector plate to said plug and operating means therefor on said plug to raise and lower said plate, associated means on said housing and plug arranged to slide the plug in said housing, a threaded packing gland adapted to screw on the rear end of said plug, a packing of soft rubber or other suitable substance adapted to seat against the rear end of said plug, a metallic disc adapted to hold said packing against the rear end of said plug when engaged by said packing gland, a plurality of guiding tubes carried by said disc and adapted to register with the bore of said plug, a telescope guiding tube carried by said plug, a telescope adapted to be inserted in said telescope guiding tube and thus through one bore of the plug, and arranged adjacent said deflector shaft with its objective lens adjacent to said deflector plate, means for securing said telescope in said telescope guiding means, and an operating tool adapted to be inserted in one of the remaining guiding means and through one bore of the plug and arranged when in position with its operating end overlying said deflector plate and said objective lens in said window, whereby any movement of said plug in said housing will impart a corresponding movement to the telescope and the deflector shaft simultaneously and whereby when the deflector plate is raised the operating tool may be given a variable angle of deflection.

8. A cystoscope comprising a sheath, a window at one end, a housing at the other end, a plug containing a plurality of passageways and slidable in said housing, devices for use in said sheath connected to said plug and having parts extending to said window and means associated with the housing and plug to position the said parts of the device at different points along the length of the window.

9. In a cystoscope, a sheath, a window at one end, a telescope having its objective lens at the window, means for deflecting a tool comprising a shaft with a pivotal member at said window, and means for moving the objective lens of the telescope and the said pivotal member along the length of the window.

10. In a cystoscope having a sheath with an elongated window at one end and provided with a deflector plate, a deflector shaft, a movable plug housed in said sheath and attached to said deflector shaft, means to move said plug and shaft to any one of a number of points within said sheath, guiding means attached in said plug and a telescope adapted to be inserted in said guiding means and arranged adjacent said deflector shaft, means for permitting inward and outward motion of said telescope in said guiding means independent of any other motion and means for securing said telescope in any desired position in said guiding means.

11. In a cystoscope having a window near one end, a telescope arranged with its objective lens in said window and its shaft extending through the other end of the cystoscope, a deflector plate, a deflector shaft lying adjacent to said telescope and means for moving both the telescope shaft and the deflector shaft along the length of the window, means for moving the telescope shaft and thus its objective lens along the length of the window independently of the deflector shaft.

In testimony whereof, I have hereunto affixed my signature.

LEO BUERGER.